(12) United States Patent
Pal

(10) Patent No.: US 9,153,946 B2
(45) Date of Patent: Oct. 6, 2015

(54) ELECTRICAL CONTACTOR ARRANGEMENT WITH THERMAL MANAGEMENT

(71) Applicant: Hamilton Sunstrand Corporation, Windsor Locks, CT (US)

(72) Inventor: Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 295 days.

(21) Appl. No.: 13/626,029

(22) Filed: Sep. 25, 2012

(65) Prior Publication Data
US 2014/0087584 A1 Mar. 27, 2014

(51) Int. Cl.
H01H 9/52 (2006.01)
H05K 7/20 (2006.01)
H02B 1/56 (2006.01)
H02B 1/056 (2006.01)
H02B 1/20 (2006.01)

(52) U.S. Cl.
CPC .......... *H02B 1/056* (2013.01); *H01H 2009/523* (2013.01); *H01H 2009/526* (2013.01); *H02B 1/20* (2013.01); *H02B 1/56* (2013.01)

(58) Field of Classification Search
CPC ......... H02B 1/56; H05K 7/20518; H01H 9/52
See application file for complete search history.

(56) References Cited

U.S. PATENT DOCUMENTS

| 5,670,936 | A | 9/1997 | Estes et al. |
| 7,723,892 | B2* | 5/2010 | Cardon et al. ......... 310/216.079 |
| 7,837,496 | B1 | 11/2010 | Pal |
| 8,138,864 | B2 | 3/2012 | Mills et al. |
| 2009/0027154 | A1 | 1/2009 | Mills et al. |
| 2011/0235244 | A1 | 9/2011 | Mills et al. |
| 2012/0152706 | A1 | 6/2012 | Mills et al. |
| 2014/0002995 | A1* | 1/2014 | Pal ............................... 361/712 |
| 2014/0091617 | A1* | 4/2014 | Horowy et al. ................ 307/9.1 |
| 2014/0334074 | A1* | 11/2014 | Pal et al. ....................... 361/676 |

OTHER PUBLICATIONS

Extended European Search Report for European Application No. 13183902.9 dated Nov. 7, 2013.

* cited by examiner

*Primary Examiner* — Robert J Hoffberg
(74) *Attorney, Agent, or Firm* — Carlson, Gaskey & Olds, P.C.

(57) ABSTRACT

A power distribution contactor mount, and a power distribution system incorporating the same, include a plurality of electrically and thermally conductive contactor posts operable to connect a contactor lead to a bus bar, a mounting panel face, wherein each of the contactor posts is received in the mounting panel face and extends through the mounting panel face, and a first heat dissipation component mounted on the mounting panel face and thermally connected to each of the contactor posts. The thermal connection is via a thermally conductive and electrically insulative polymer insert, and each of the posts protrudes through the first heat dissipation component.

15 Claims, 4 Drawing Sheets

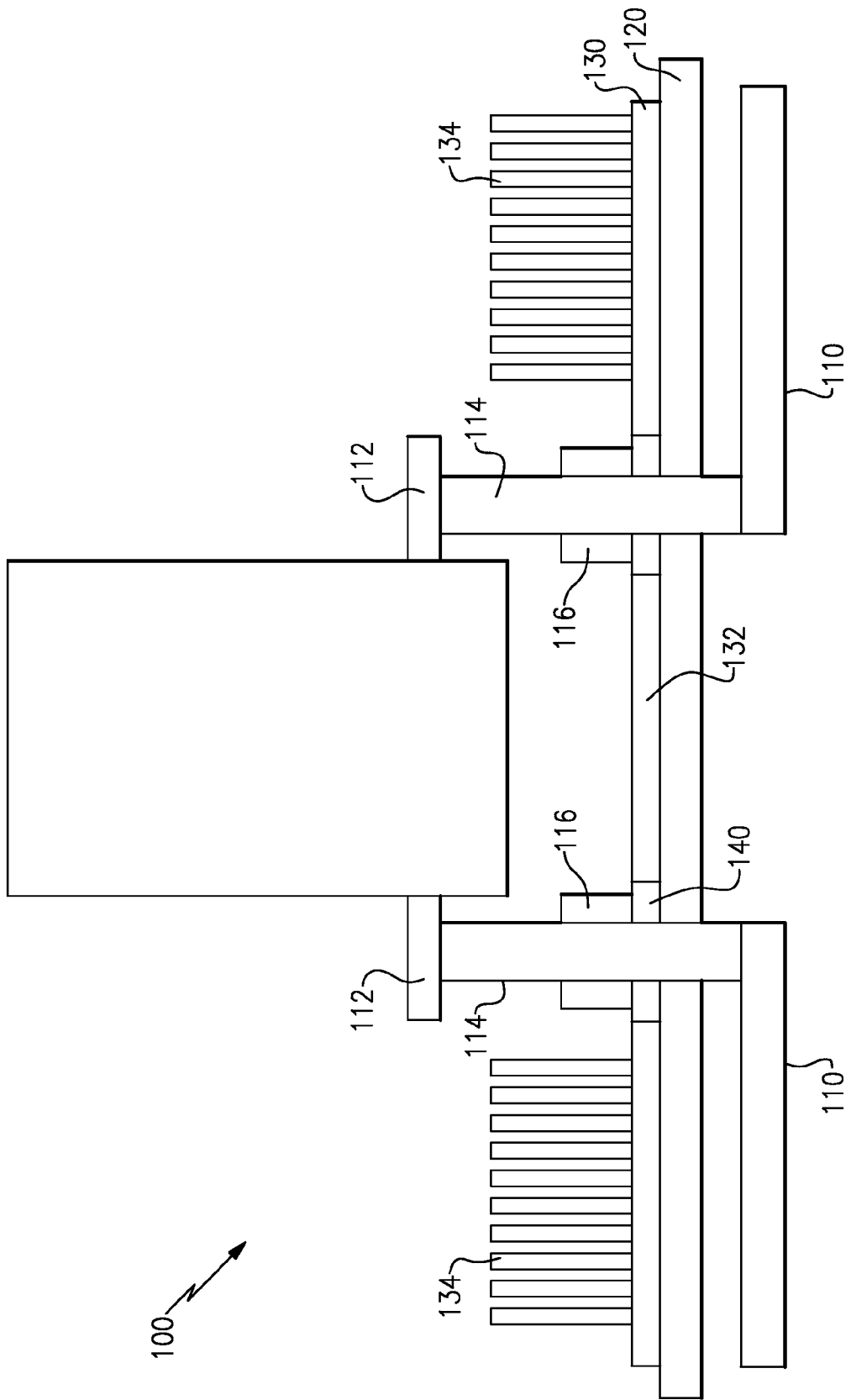

US 9,153,946 B2

ELECTRICAL CONTACTOR ARRANGEMENT WITH THERMAL MANAGEMENT

TECHNICAL FIELD

The present disclosure is directed toward power distribution contactors, and more particularly to power distribution contactors including thermal management features.

BACKGROUND OF THE INVENTION

Commercial aircraft include onboard power systems typically including a power generation system and a power distribution system. The power systems are used to generate and distribute power during operation of the aircraft, and the power is used to power onboard electronic systems. As part of the power distribution system, electric contactors control power flow over a series of power distribution buses. The contactors control the flow of current in the bus bars, and mechanically switch current on or off as needed by the power systems.

Due to the switching within the contactor modules, the contactors generate heat during operation of the power distribution system. Heat from the contactor leads is conducted to external power distribution bus bars and from the external power distribution bus bars into the ambient atmosphere. To accommodate this cooling feature, the external power distribution bus bars are sized large enough that the heat can be properly dissipated. An additional step utilized to facilitate the additional heat dissipation requirements is the utilization of copper, in place of the lighter weight aluminum, as the primary metal of the bus bars. Utilization of a heavier material increases the weight of the bus bar and the overall power distribution assembly.

SUMMARY OF THE INVENTION

Disclosed is a power distribution system including a bus bar contactor having a contactor circuit with a plurality of contactor leads, a plurality of electrically and thermally conductive contactor posts operable to connect the contactor leads to a bus bar, a mounting panel face, wherein each of the contactor posts is received in the mounting panel face and extends through the mounting panel face, a first heat dissipation component thermally connected to each of the contactor posts, wherein the thermal connection is via a thermally conductive and electrically insulative polymer insert, and wherein each of the posts protrudes through the first heat sink.

Also disclosed is a power distribution contactor mount including a plurality of electrically and thermally conductive contactor posts operable to connect contactor leads to a bus bar, a mounting panel face, wherein each of the contactor posts is received in the mounting panel face and extends through the mounting panel face, a first heat dissipation component mounted on the mounting panel face and thermally connected to each of the contactor posts, wherein the thermal connection is via a thermally conductive and electrically insulative polymer insert, and wherein each of the posts protrudes through said first heat dissipation component.

Also disclosed is a method for cooling a power distribution contactor including the steps of thermally connecting a power distribution contactor to a heat dissipation feature using a thermally conductive polymer insert and dissipating heat using the heat dissipation feature.

BRIEF DESCRIPTION OF THE DRAWINGS

FIG. 2 schematically illustrates a bus bar contactor module installed in a power distribution panel.

DETAILED DESCRIPTION

Figure 1:
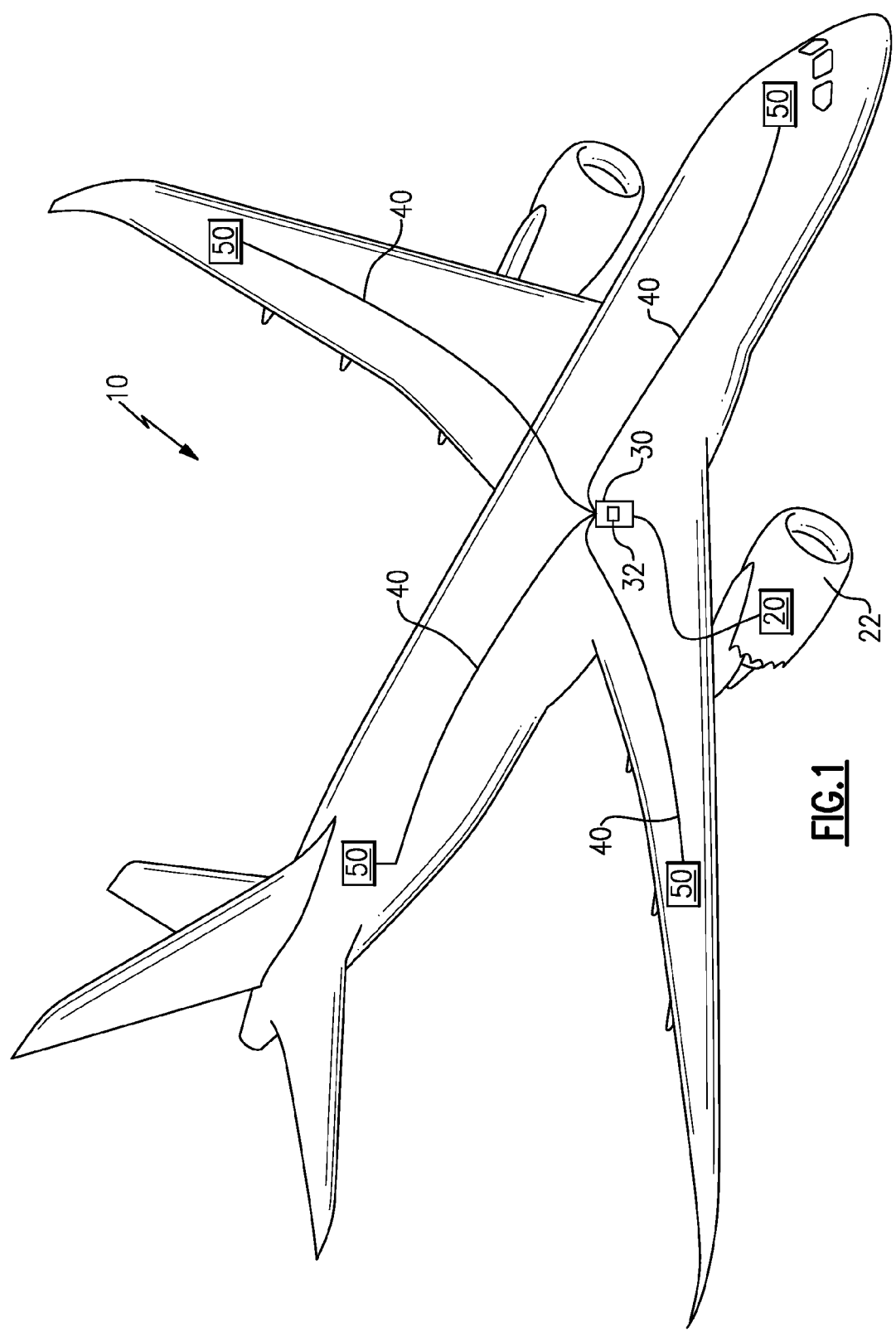
FIG. 1 schematically illustrates an aircraft power distribution system.

FIG. 1 schematically illustrates an aircraft 10. During operation of the aircraft 10, electric power is generated in a generator 20 using mechanical rotation of a jet engine 22. The electric power generated in the generator 20 is passed to a power distribution system 30 that uses contactors 32 to control power distribution over power conduits 40 and thereby distribute electric power to multiple on board electric systems 50 as needed.

The contactors 32 are mounted in a power distribution panel and operate to control current through the power distribution system 30 by switching a mechanical relay, or an electrical equivalent of a mechanical relay. As a result of this functionality, each of the contactor modules 32 generates heat. In order to prevent an undesirable buildup of heat within the power distribution system 30, the heat is shunted to an attached bus bar being controlled by the contactor modules 32 and the heat is dissipated into the ambient air from the bus bar.

FIG. 2 illustrates an example power bus contactor module 100 installed on a power distribution panel 120. The power bus contactor module 100 includes electric leads 112 that are connected to a power distribution bus bar 110 using contactor posts 114. The contactor posts 114 are maintained in position using a post support 116. The contactor module 100 controls power flow across the power distribution bus bar 110 utilizing standard internal switching relays that connect the bus bars 110 when power is desired to flow, and disconnect the bus bars 110 when no power flow is desired.

The contactor module 100 is mounted on a non-conductive power distribution panel 120. In a typical arrangement, the power distribution panel 120 mounts multiple power distribution components in a centralized location.

Also mounted on the power distribution panel 120 is a heat sink 130. The heat sink 130 is connected to the power distribution panel 120 via a heat sink base 132. The heat sink includes multiple cooling fins 134 extending away from the heat sink base 132 and the power distribution panel 120. As the non-conductive power distribution panel 120 is not thermally conductive, and the utilization of an electrically conductive connection to the heat sink 130 would cause the contactor module 100 to be shorted across the heat sink 130, a thermally conductive polymer insert 140 connects the contactor posts 114 to the heat sink 130. Similarly, the post support 116 abuts only the thermally conductive polymer insert 140 in order to prevent short circuiting the contactor module 100. For the purposes of this application, a thermally conductive polymer is any polymer that is both thermally conductive and electrically insulative, such as a COOLPOLY plastic.

The action of switching power, as well as the flow of power through the contactor module 100, generates large amounts of heat that builds up to undesirable levels if the heat is not dissipated into the surrounding atmosphere. In the illustrated example of FIG. 2, heat generated in the contactor module 100 flows through the electric leads 112 into the contactor posts 114. From the contactor posts, the heat flows through the thermally conductive inserts 140 into the base 132 of the heat sink 130 and into the cooling fins 134. The heat is then dissipated into the ambient atmosphere from the heat sink base 132 and the cooling fins 134. A minimal amount of heat is similarly dissipated in the atmosphere from the leads 112 and the contactor posts 114. The cooling fins 134 increase the surface area of the heat sink 130, thereby increasing the amount of heat that can be dissipated in the ambient air in a smaller volume.

Figure 3B:
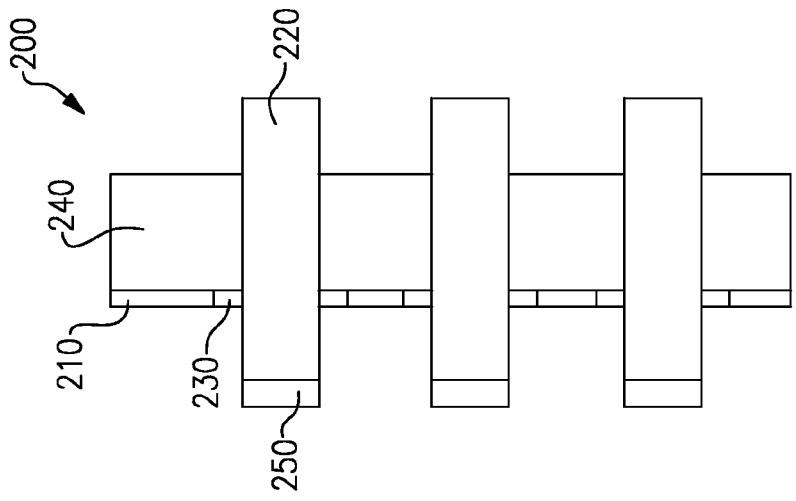
FIG. 3B schematically illustrates a side view of the three phase contactor module mount of FIG. 3A.
Figure 3A:
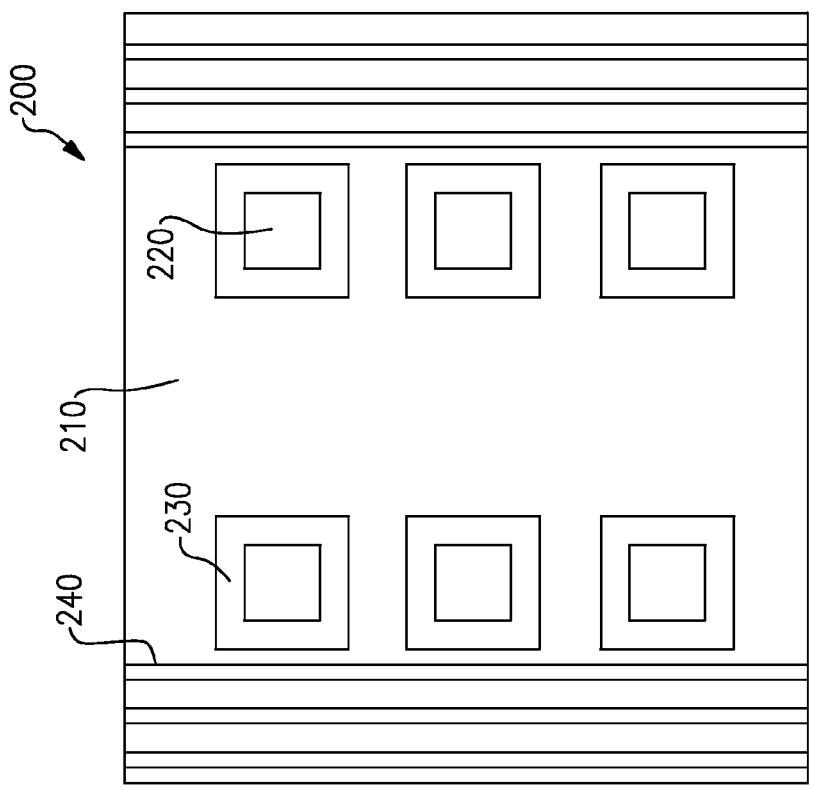
FIG. 3A schematically illustrates a front view of a three phase contactor module mount in a power distribution panel.

FIGS. 3A and 3B schematically illustrated a top view (FIG. 3A) and a side view (FIG. 3B) of a three phase contactor module mount 200 in a power distribution panel. Three pairs of contactor posts 220 (one pair per phase) protrude through a heat sink base 210 from a power distribution bus 250. The contactor posts 220 are electrically isolated from the heat sink base 210 via a thermally conductive insert 230. The heat sink includes multiple cooling fins 240 that operate dissipate heat into the surrounding atmosphere as described above with regards to FIG. 1.

Figure 4:
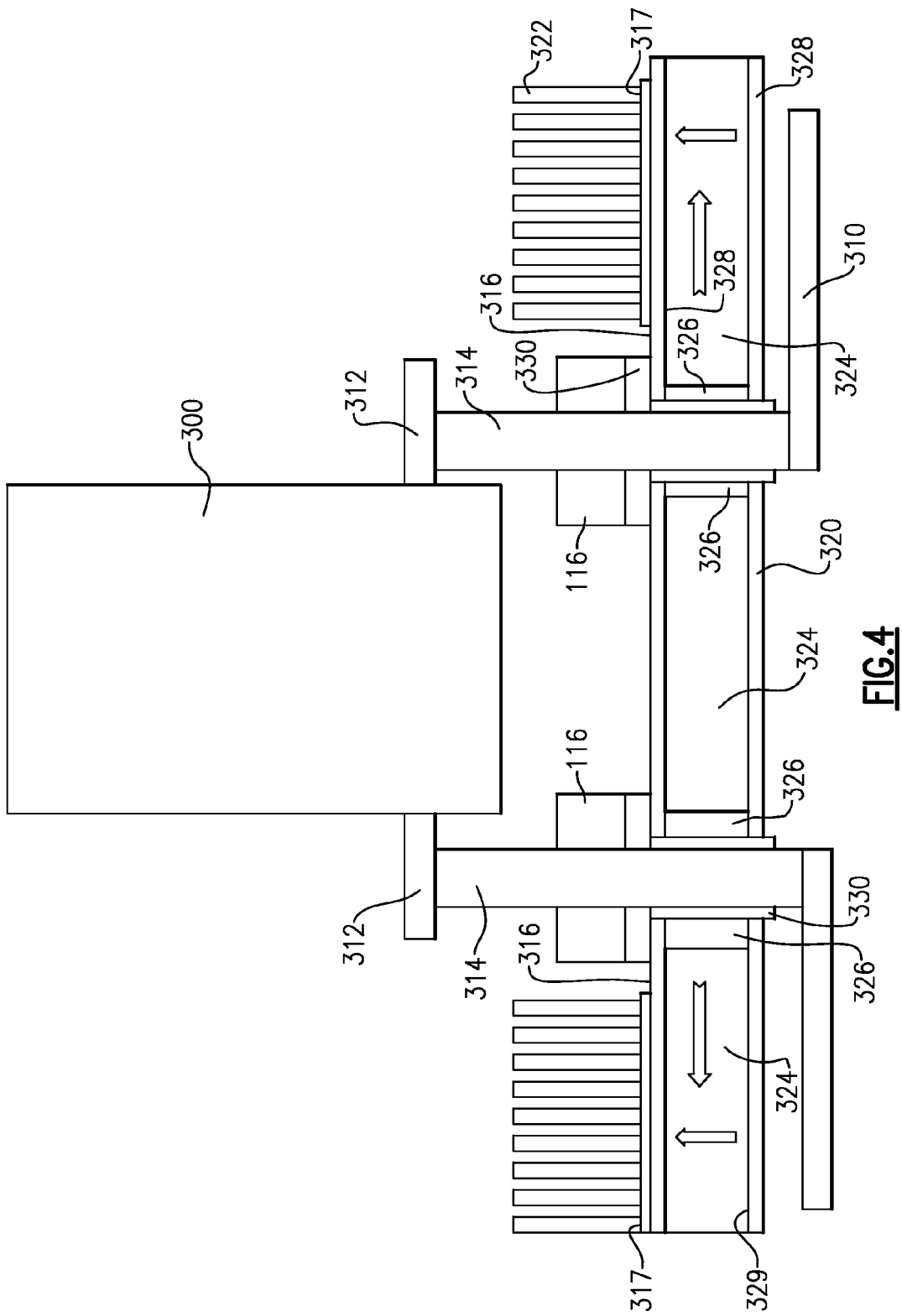
FIG. 4 schematically illustrates a second alternate example bus bar contactor module installed in a power distribution pane.

FIG. 4 illustrates an alternate example contactor module 300 and mounting arrangement. As with the example of FIG. 1, the contactor module includes electric leads 312 connecting the contactor module to contactor posts 314. The contactor posts 314 connect the electric leads 312 to a power distribution bus bar 310, thereby allowing the contactor module 300 to control the flow of current through the power distribution bus bar 310.

In place of the non-conductive power distribution panel of the example of FIG. 1, the power distribution panel of FIG. 4 is a thermal ground plane 320. The thermal ground plane 320 includes a hollow core 324 that is partially filled with a coolant and includes multiple heat fins 322. In some examples, the multiple heat fins are connected to the thermal ground plane via a perforated heat sink base 317. A surface 316 of the thermal ground plane 320 can be referred to as a mounting panel face, the perforated heat sink base 317 contacting the mounting face panel 316. In order to accommodate the thermal ground plane 320, an insert 330 constructed of a thermally conductive polymer electrically isolates the contactor posts 314 from the thermal ground plane 320. The portions of the thermal ground plane 320 immediately contacting the thermally conductive polymer insert 330 are evaporating surfaces 326, and the surfaces immediately contacting the cooling fins 322 are condensing surfaces 328.

During operation of the contactor module 300, the generated heat conducts out of the contactor module 300 into the contactor posts 314 by way of the leads 312. From the leads, the heat conducts into the thermal ground plane 320 through the thermally conductive polymer insert 330. The heat enters the thermal ground plane 320 at the evaporating surface 326, which is immediately adjacent the contactor 314. As the evaporating surface heats up, the coolant within the thermal ground plane 320 converts from a liquid state into a gas state (evaporates). The evaporated coolant flows away from the evaporating surface 326 and contacts the cooler condensing surface 328 that is thermally removed from the evaporating surface 326. The condensing surface draws heat out of the evaporated coolant and into the cooling fins 322. This removal of heat from the coolant causes the coolant to return to a liquid form (condense).

The condensed coolant contacts a wicking surface 329. The wicking surface 329 includes a wicking structure that draws the liquid coolant back towards the evaporating surface 326. Once the liquid coolant is returned to the evaporating surface, the liquid coolant evaporates again, and the cooling cycle is repeated. In this way, the heat is dissipated using both a coolant state change and cooling fin 322 dissipation into the ambient atmosphere.

In another alternate example, the contactor module mount is configured as in FIG. 4 with the addition of a heat sink base providing an efficient thermal path directly from the contactor posts 314 to the cooling fins 322, thereby combining the contactor module mount of FIG. 2 and the contactor module mount of FIG. 4. This combination recognizes benefits of both configurations with a minimal reduction in the effectiveness of each of the ambient air dissipation and thermal ground plane cooling methods.

Although a embodiment of this invention has been disclosed, a worker of ordinary skill in this art would recognize that certain modifications would come within the scope of this invention. For that reason, the following claims should be studied to determine the true scope and content of this invention.

The invention claimed is:

1. A power distribution system comprising:
a bus bar contactor having a contactor circuit, the bus bar contactor including a plurality of contactor leads, a plurality of electrically and thermally conductive contactor posts operable to connect said contactor leads to a bus bar;
a hollow thermal ground plate including a mounting panel face, wherein each of said contactor posts is received in said mounting panel face and protrudes through said mounting panel face; and
said hollow thermal ground plate being thermally connected to each of said contactor posts via at least one of a plurality of a thermally conductive and electrically insulative polymer inserts, wherein each of said posts protrudes through a side of said hollow thermal ground plate opposite to said mounting panel face.

2. The power distribution system of claim 1, wherein each of said contactor posts further comprises a structural block operable to maintain a corresponding one of said contactor posts in position.

3. The power distribution system of claim 1, wherein said hollow thermal ground plate comprises a perforated heat sink base contacting said mounting panel face and a plurality of heat sink cooling fins extending outward from said perforated base.

4. The power distribution system of claim 1, wherein said hollow thermal ground plate is electrically conductive.

5. The power distribution system of claim 1, wherein said hollow thermal ground plate includes a plurality of evaporating surfaces, each of said evaporating surfaces thermally contacting one of said plurality of contactor posts through at least one of said plurality of inserts.

6. The power distribution system of claim 5, wherein said hollow thermal ground plate further comprises at least one condensing plate thermally removed from said plurality of evaporating surfaces.

7. The power distribution system of claim 6, further comprising a wick structure operable to drive a condensed coolant to each of said evaporating surfaces.

8. The power distribution system of claim 1, wherein said hollow thermal ground plate is at least partially filled with an evaporating dielectric fluid.

9. The power distribution system of claim 1, wherein said hollow thermal ground plate comprises a plurality of heat fins extending away from said hollow thermal ground plate.

10. A power distribution contactor mount comprising:
a plurality of electrically and thermally conductive contactor posts operable to connect contactor leads to a bus bar;

a hollow mounting panel, wherein each of said contactor posts is received in said hollow mounting panel and protrudes through said hollow mounting panel;

wherein said hollow mounting panel is a heat dissipation component and is thermally connected to each of said contactor posts, wherein said each of said contactor posts is thermally connected to said hollow mounting panel via a thermally conductive and electrically insulative polymer insert.

11. The power distribution contactor of claim 10, wherein said hollow mounting panel includes a plurality of evaporating surfaces, each of said evaporating surfaces thermally contacting at least one of said plurality of contactor posts through at least one of said plurality of inserts.

12. The power distribution contactor of claim 11, wherein said hollow mounting panel further comprises at least one condensing surface thermally removed from said evaporating surfaces.

13. The power distribution contactor of claim 12, said hollow mounting panel further comprising a wick structure operable to drive a condensed coolant to at least one of said evaporating surfaces.

14. The power distribution contactor of claim 11, wherein said hollow mounting panel is at least partially filled with an evaporating dielectric fluid.

15. The power distribution contactor of claim 11, further comprising a plurality of heat fins extending away from said hollow mounting panel.

* * * * *